United States Patent
Iwasaki et al.

(10) Patent No.: US 12,051,246 B2
(45) Date of Patent: Jul. 30, 2024

(54) NON-TRANSITORY COMPUTER READABLE RECORDING MEDIUM, SETTING METHOD, DETECTION METHOD, SETTING APPARATUS, AND DETECTION APPARATUS

(71) Applicant: Fujitsu Limited, Kawasaki (JP)

(72) Inventors: Sho Iwasaki, Yokohama (JP); Daisuke Uchida, Kawasaki (JP); Genta Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 90 days.

(21) Appl. No.: 17/978,980

(22) Filed: Nov. 2, 2022

(65) Prior Publication Data

US 2023/0267744 A1     Aug. 24, 2023

(30) Foreign Application Priority Data

Feb. 18, 2022   (JP) .............................. 2022-023946

(51) Int. Cl.
| | |
|---|---|
| *G06V 10/74* | (2022.01) |
| *G06T 7/50* | (2017.01) |
| *G06T 17/00* | (2006.01) |
| *G06V 20/52* | (2022.01) |
| *G06V 40/20* | (2022.01) |

(52) U.S. Cl.
CPC ................ *G06V 20/52* (2022.01); *G06T 7/50* (2017.01); *G06T 17/00* (2013.01); *G06V 10/761* (2022.01); *G06V 40/20* (2022.01); *G06T 2207/10028* (2013.01); *G06T 2207/20044* (2013.01)

(58) Field of Classification Search
CPC .............................. G06V 10/761; G06T 17/00
See application file for complete search history.

(56) References Cited

U.S. PATENT DOCUMENTS

| | | | |
|---|---|---|---|
| 10,282,852 B1 | 5/2019 | Buibas et al. | |
| 10,373,322 B1 | 8/2019 | Buibas et al. | |

FOREIGN PATENT DOCUMENTS

| | | |
|---|---|---|
| CN | 109871804 A | 6/2019 |
| JP | 2021-107989 A | 7/2021 |

OTHER PUBLICATIONS

Extended European search report issued on Jun. 7, 2023, in corresponding European patent Application No. 22204087.5, 8 pages.

*Primary Examiner* — Y Lee
*Assistant Examiner* — Young Lee
(74) *Attorney, Agent, or Firm* — XSENSUS LLP

(57) ABSTRACT

A non-transitory computer-readable recording medium has stored therein a setting program that causes a computer to execute a process, the process including acquiring a video from a camera, identifying a depth indicating a distance from the camera to each of constituent elements of the video acquired from the camera, generating a three-dimensional in-store model, generating skeleton information on a person who moves inside the store from the video acquired from the camera, setting a range and a direction of an aisle in the store in the generated three-dimensional in-store model based on a change in the generated skeleton information and setting a detection line in the storage based on the range and the direction of the aisle in the store, the detection line for detecting that the person has extended a hand to a product.

10 Claims, 14 Drawing Sheets

FIG.7

| USER ID | MOVEMENT TRAJECTORY |
|---|---|
| U101 | INFORMATION ON MOVEMENT TRAJECTORY WITH USER ID OF "U101" |
| U102 | INFORMATION ON MOVEMENT TRAJECTORY WITH USER ID OF "U102" |
| U103 | INFORMATION ON MOVEMENT TRAJECTORY WITH USER ID OF "U103" |
| U104 | ... |

NON-TRANSITORY COMPUTER READABLE RECORDING MEDIUM, SETTING METHOD, DETECTION METHOD, SETTING APPARATUS, AND DETECTION APPARATUS

CROSS-REFERENCE TO RELATED APPLICATION(S)

This application is based upon and claims the benefit of priority of the prior Japanese Patent Application No. 2022-023946, filed on Feb. 18, 2022, the entire contents of which are incorporated herein by reference.

FIELD

The embodiment discussed herein is related to a non-transitory computer readable recording medium and the like.

BACKGROUND

In recent year, a technology for recognizing taking in and out a product with respect to a product shelf (shelf) by a customer in a store is attracting attention. With use of the technology, it becomes possible to introduce self-checkout or detect shoplifting, for example. The technology for recognizing taking in and out a product includes a method of using a camera and an image recognition technique, a method of adding Radio Frequency Identification (RFID) to each of products, a method of installing a weight sensor for each of shelves, and the like.

The method of using a camera and the image recognition technique has the advantage of being easily introducible as compared to the method of adding RFID to each of products and the method of installing a weight sensor for each of shelves. Further, in the method of using a camera and the image recognition technique, it is possible to suppress additional cost by using an existing monitoring camera, so that the method is in high demand.

One example of the conventional technology for recognizing taking in and out a product using a camera and the image recognition technique will be described below. FIG. 14 is a diagram for explaining the conventional technology. The conventional technology uses a camera 6 that is installed above a shelf 5. The shelf 5 located on the left side is a front view of the shelf 5, and the shelf 5 on the right side is a top view of the shelf 5. In the conventional technology, a detection line 5a is set in the shelf 5 in advance.

In the conventional technology, a video of the camera 6 is analyzed to detect a hand of a person, and when the hand of the person through by the detection line 5a, taking in and out a product is recognized by using an image of a peripheral area of the hand.

Patent Literature 1: Japanese Laid-open Patent Publication No. 2021-107989

However, in the conventional technology as described above, there is a problem in that taking in and out a product is erroneously detected.

For example, when a monitoring camera is used, a positional relationship between a camera and a shelf is different for each combination of the camera and the shelf, and therefore, it is difficult to use the detection line that is uniformly defined in advance as in the conventional technology.

In particular, depending on imaging conditions, an appropriate detection line may be different even in the same shelf, depending on a position of a person. FIG. 15 is a diagram illustrating an example of an appropriate detection line. For example, an appropriate detection line at a position of a person C1 is a detection line 7a of a shelf 7. An appropriate detection line at a position of a person C2 is a detection line 7b of the shelf 7. The person moves in front of the shelf 7, and therefore, if a detection line that is set in advance is used as in the conventional technology, taking in and out a product may be erroneously detected.

SUMMARY

According to an aspect of an embodiment, a non-transitory computer-readable recording medium has stored therein a setting program that causes a computer to execute a process, the process including acquiring a video from a camera that is set in a store that has a storage in which a product is stored; identifying a depth indicating a distance from the camera to each of constituent elements of the video acquired from the camera, by inputting the acquired video into a machine learning model; generating a three-dimensional in-store model that is configured with the identified depth indicating the distance from the camera to each of the constituent elements of the video; generating skeleton information on a person who moves inside the store from the video acquired from the camera; setting a range and a direction of an aisle in the store in the generated three-dimensional in-store model based on a change in the generated skeleton information; and setting a detection line in the storage based on the range and the direction of the aisle in the store, the detection line for detecting that the person has extended a hand to a product.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a data structure of a movement trajectory table;

DESCRIPTION OF EMBODIMENT(S)

Preferred embodiments of the present invention will be explained with reference to accompanying drawings. The present invention is not limited by the embodiments below.

Figure 1:
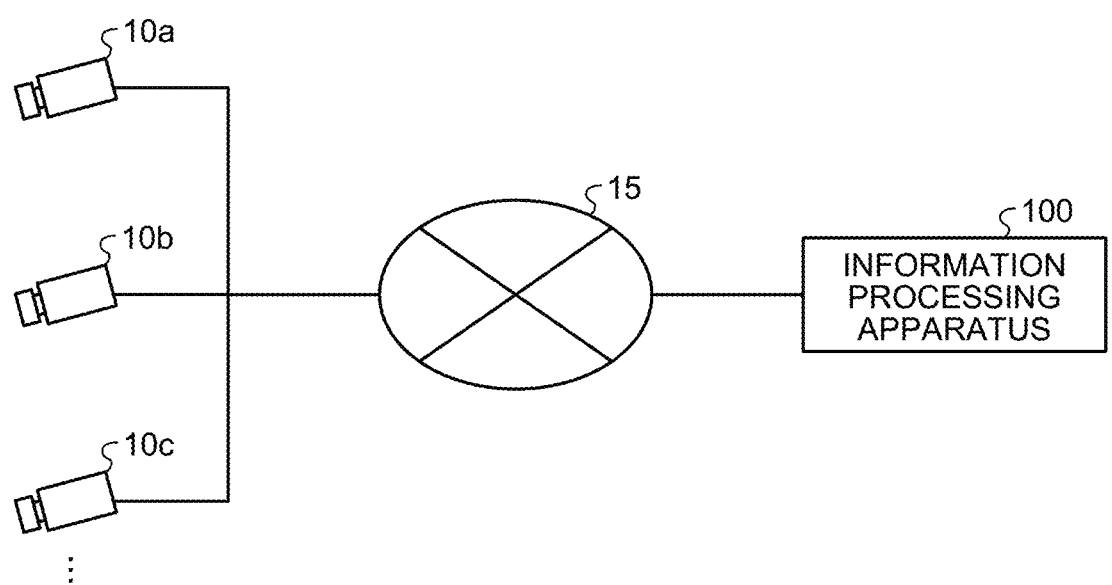
FIG. 1 is a diagram illustrating a system according to the present embodiment.

FIG. 1 is a diagram illustrating a system according to the present embodiment. As illustrated in FIG. 1, the system includes cameras 10a, 10b, and 10c and an information processing apparatus 100. The information processing apparatus 100 is one example of a setting apparatus and a detection apparatus. The cameras 10a to 10c and the information processing apparatus 100 are connected to one another via a network 15.

The cameras 10a to 10c are cameras that are installed in a store that has a storage unit, such as a shelf, in which a product is stored. Each of the cameras 10a to 10c captures a video including a shelf installed in the store, and transmits information on the captured video to the information processing apparatus 100. In the following descriptions, the information on the video will be referred to as "video information". The video information includes chronological images (still images). The cameras 10a to 10c will be collectively referred to as a "camera 10".

The information processing apparatus 100 sets a detection line for detecting taking in and out a product that is stored in a shelf, on the basis of the video information received from the camera 10. Further, the information processing apparatus 100 detects taking in and out a product by a user by using the set detection line.

Figure 2:
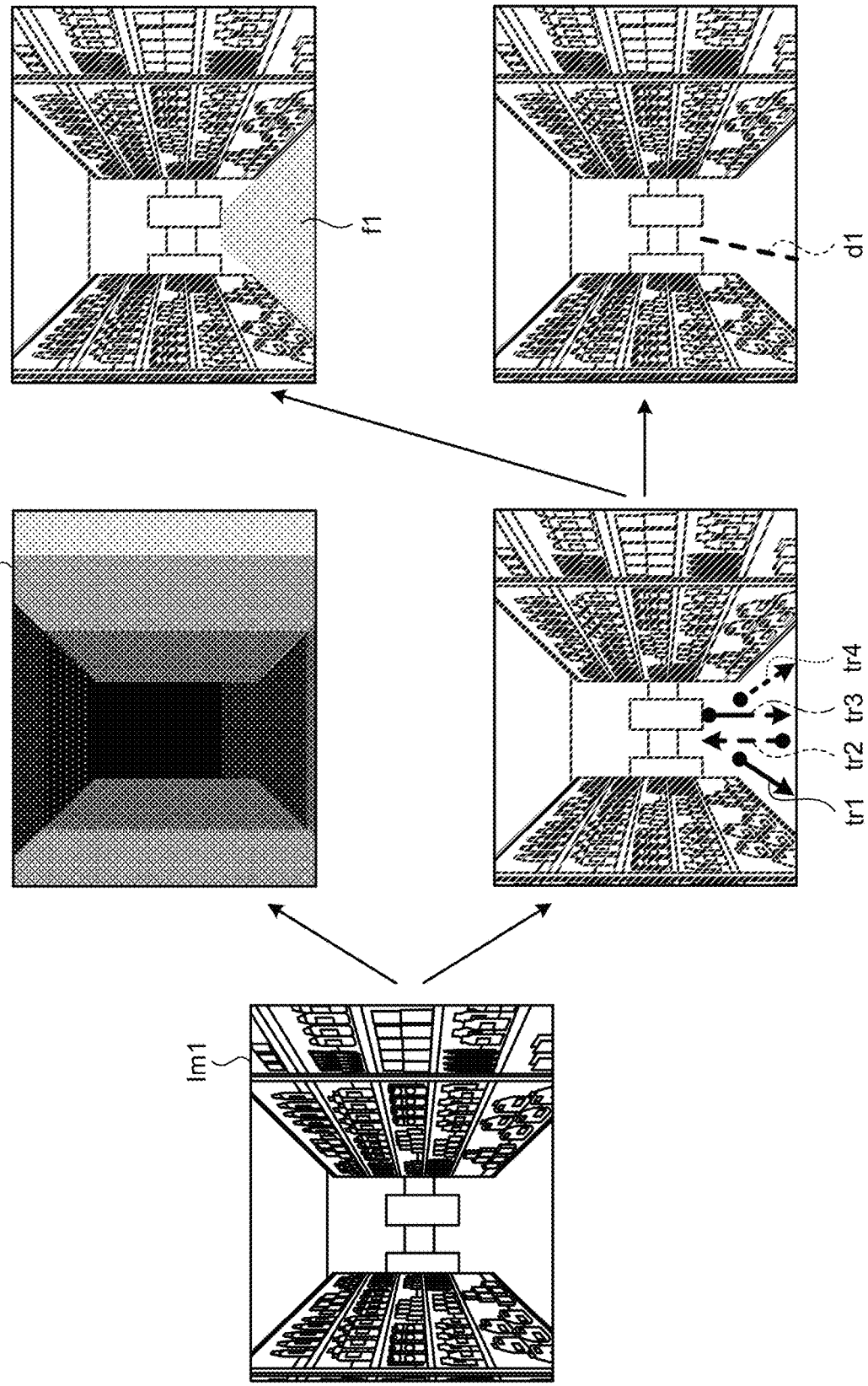
FIG. 2 is a first diagram for explaining a process performed by an information processing apparatus according to the present embodiment.
Figure 3:
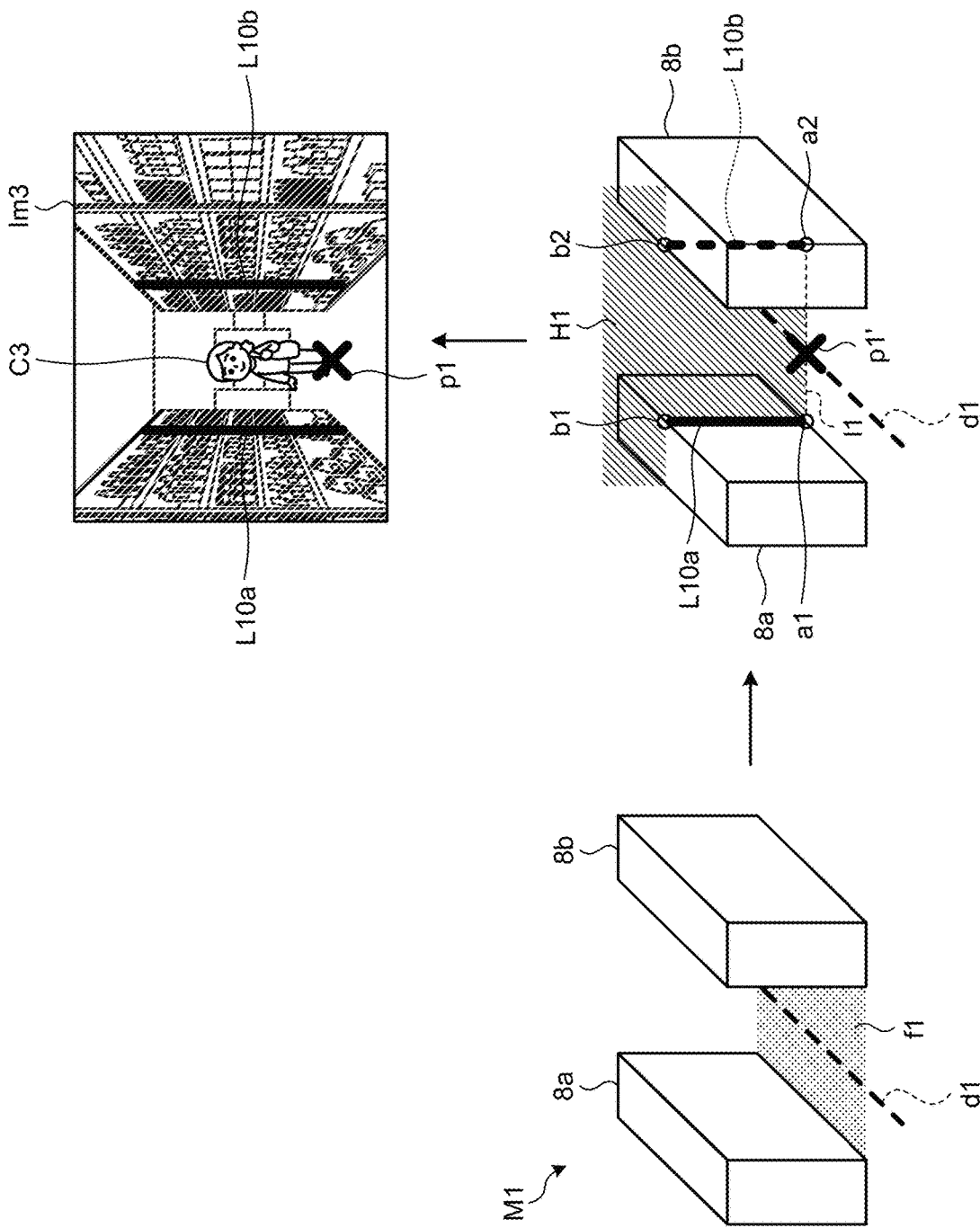
FIG. 3 is a second diagram for explaining the process performed by the information processing apparatus according to the present embodiment.

FIG. 2 and FIG. 3 are diagrams for explaining a process performed by the information processing apparatus according to the present embodiment. First, FIG. 2 will be described. The information processing apparatus 100 inputs video information Im1 received from the camera 10 to a trained learning model that performs monocular depth estimation, and generates a depth image Im2. The depth image Im2 includes a plurality of pixels, and distance information is set in each of the pixels. Each of the pixels of the depth image Im2 corresponds to each of pixels at the same coordinate in the video information (image) Im1. The distance information that is set in each of the pixels of the depth image Im2 indicates a distance between an in-store area corresponding to the pixel of the video information Im1 and the camera 10.

When the information processing apparatus 100 generates the depth image Im2, it is assumed that the video information Im1 does not include a user. In other words, the information processing apparatus 100 generates the depth image Im2 by using the video information Im1 that is captured by the camera 10 during a time period in which a user is not present.

The information processing apparatus 100 generates skeleton information on a user who moves inside the store on the basis of the video information Im1, and identifies a movement trajectory on the basis of a change of a foot part in the generated skeleton information. When the information processing apparatus 100 identifies the movement trajectory, it is assumed that the video information Im1 includes a user. In other words, the information processing apparatus 100 identifies the movement trajectory of the user by using the video information Im1 that is captured by the camera 10 during a time period in which the user is present.

In the example illustrated in FIG. 2, a case is illustrated in which the information processing apparatus 100 identifies movement trajectories tr1, tr2, tr3, and tr4. The information processing apparatus 100 identifies an aisle area f1 and an aisle direction d1 on the basis of the movement trajectories tr1, tr2, tr3, and tr4. For example, the information processing apparatus 100 identifies moving ranges of the movement trajectories tr1 to tr4 as the aisle area f1. The information processing apparatus 100 identifies a mean vector of displacement vectors of the movement trajectories tr1 to tr4 as the aisle direction d1.

The information processing apparatus 100 generates an in-store 3D model in a three-dimensional space, on the basis of the depth image Im2, the aisle area f1, and the aisle direction d1. For example, the information processing apparatus 100 converts the distance information on the depth image Im2, a coordinate of the aisle area f1, and a coordinate of the aisle direction d1 into three-dimensional coordinates on the in-store 3D model, and synthesizes the coordinates.

Explanation on FIG. 3 will be given below. For example, as illustrated in FIG. 3, shelves 8a and 8b, the aisle area f1, and the aisle direction d1 are set in an in-store 3D model M1. The information processing apparatus 100 estimates skeleton information on a user C3 on the basis of video information Im3 that includes the user C3, and identifies a position p1 of a foot of the user C3.

The information processing apparatus 100 converts the position p1 to a position p1' in the in-store 3D model M1. The information processing apparatus 100 sets a plane H1 in the in-store 3D model M1 on the basis of the position p1' and the aisle direction d1. A segment l1 at a lower edge of the plane H1 passes through the position p1' and is perpendicular to the aisle direction d1.

The information processing apparatus 100 sets a detection line L10a that connects a point a1 at which the segment l1 and the shelf 8a come into contact with each other and an upper edge b1 of the shelf 8a by using the fact that the shelves 8a and 8b for products are installed so as to be oriented perpendicular to the aisle direction d1. The information processing apparatus 100 sets a detection line L10b that connects a point a2 at which the segment l1 and the shelf 8b come into contact with each other and an upper edge b2 of the shelf 8b. The information processing apparatus 100 performs the process as described above every time the user C1 moves and the position p1 is changed, and sets the detection lines L10a and L10b again. For example, the information processing apparatus 100 calculates a detection line for each of representative positions in advance, obtains, for the position p1, a representative position that is located close to the position p1, and adopts a detection line corresponding to the position p1. Alternatively, the information processing apparatus 100 sets a detection line by integrating detection lines of (a plurality of) representative positions located close to the position p1, in accordance with distances between the position p1 and the representative positions.

The information processing apparatus 100 detects taking in and out a product by the user C3 by using the detection lines L10a and L10b, by using the fact that the user C3 faces the shelf 8a (8b) when taking out a product from the shelf 8a (8b).

Figure 4:
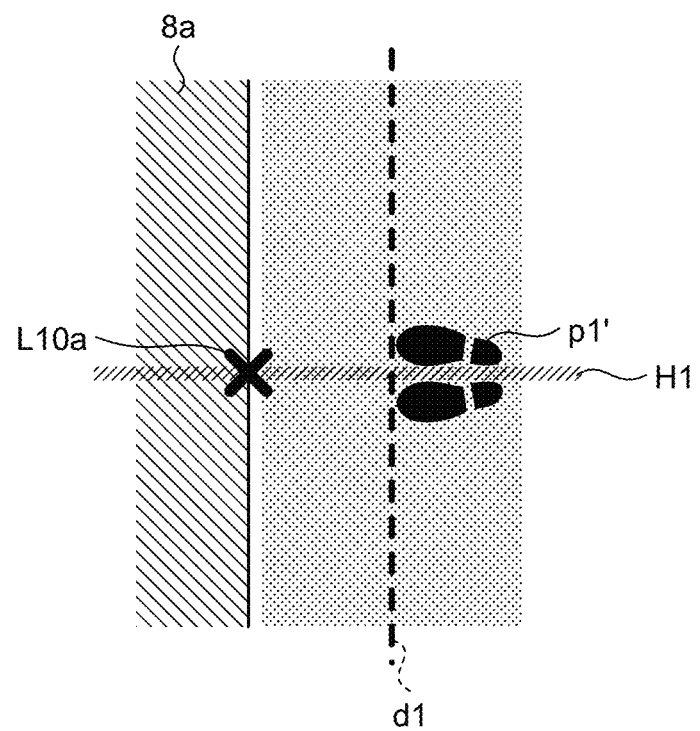
FIG. 4 is a diagram for complementing the process performed by the information processing apparatus according to the present embodiment.

FIG. 4 is a diagram for complementing the process performed by the information processing apparatus according to the present embodiment. FIG. 4 is a top view of the in-store 3D model M1 illustrated in FIG. 3. As illustrated in FIG. 4, the shelf 8a for products is installed so as to be oriented perpendicular to the aisle direction d1. For example, when the user stands at the position p1' and takes out a product from the shelf 8a, the user faces the shelf 8a. In other words, the segment l1 illustrated in FIG. 3 is perpendicular to the aisle direction d1.

As described above, the information processing apparatus 100 generates the in-store 3D model M1 on the basis of the depth image and the movement trajectory of the user obtained from the video information from the camera 10, sets a detection line of a shelf for each standing position of the user on a floor, and uses the detection line for detection. In this manner, by setting the detection line for each standing position of the user, it is possible to more accurately detect taking in and out a product as compared to a case in which the detection line is set in advance as in the conventional technology.

Figure 5:
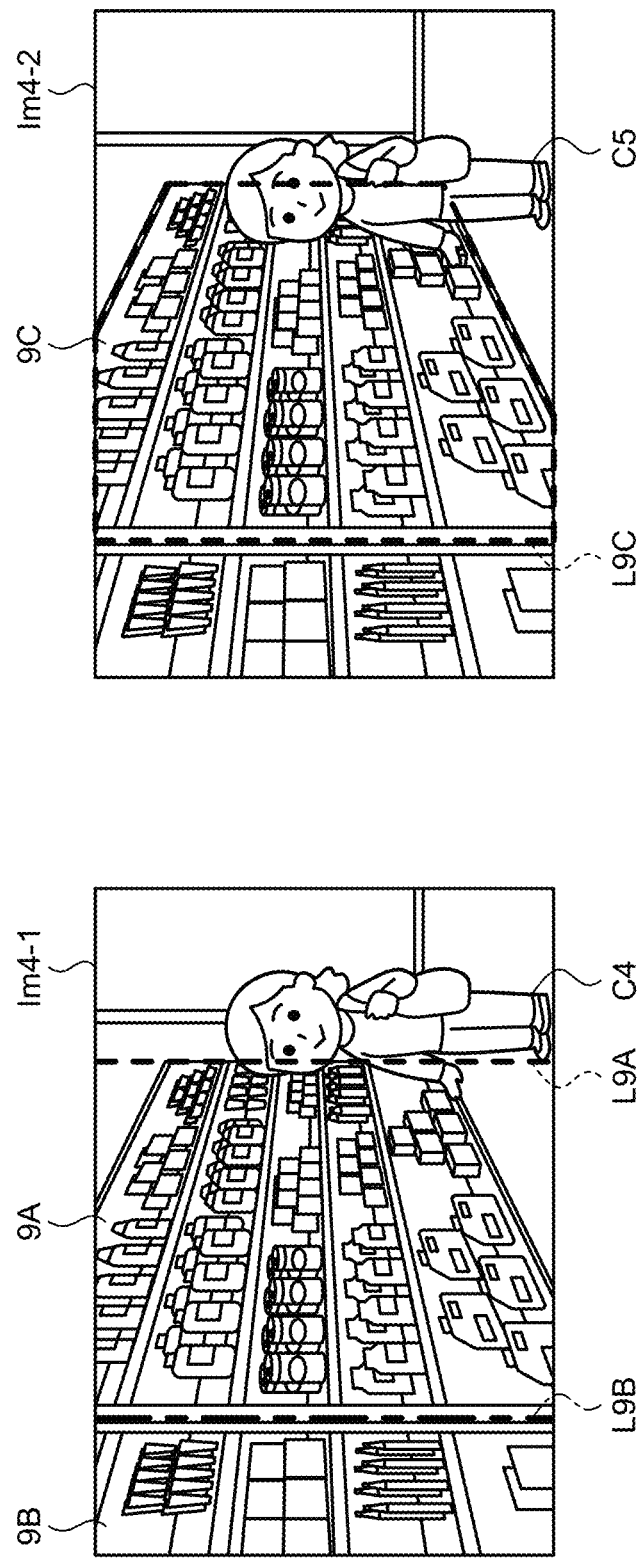
FIG. 5 is a diagram for explaining an example of erroneous detection in the conventional technology.

FIG. 5 is a diagram for explaining an example of erroneous detection in the conventional technology. An image Im4-1 in FIG. 5 includes shelves 9A and 9B, and detection lines L9A and L9B are set in advance. The detection line L9A is used to detect taking in and out a product stored in the shelf 9A. The detection line L9B is used to detect taking in and out a product stored in the shelf 9B. As for the detection lines L9A and L9B, the detection lines L9A and L9B are not set in accordance with a position of a user as in the information processing apparatus 100 of the present embodiment. Therefore, even when a user C4 moves in front of the shelf 9A and does not take in and out a product stored in the shelf 9A, a hand of the user C4 exceeds the detection line L9A, which may lead to erroneous detection.

An image Im4-2 in FIG. 5 includes a shelf 9C, and, for example, a contour of the shelf is set as a detection line L9C in advance. The detection line L9C is used to detect taking in and out a product stored in the shelf 9C. As for the detection line L9C, the detection line L9C is not set in accordance with a position of a user as in the information processing apparatus 100 of the present embodiment. Therefore, even when a user C5 moves in front of the shelf 9C and does not take in and out a product stored in the shelf 9C, a hand of the user C5 exceeds the detection line L9C, which may lead to erroneous detection.

Figure 6:
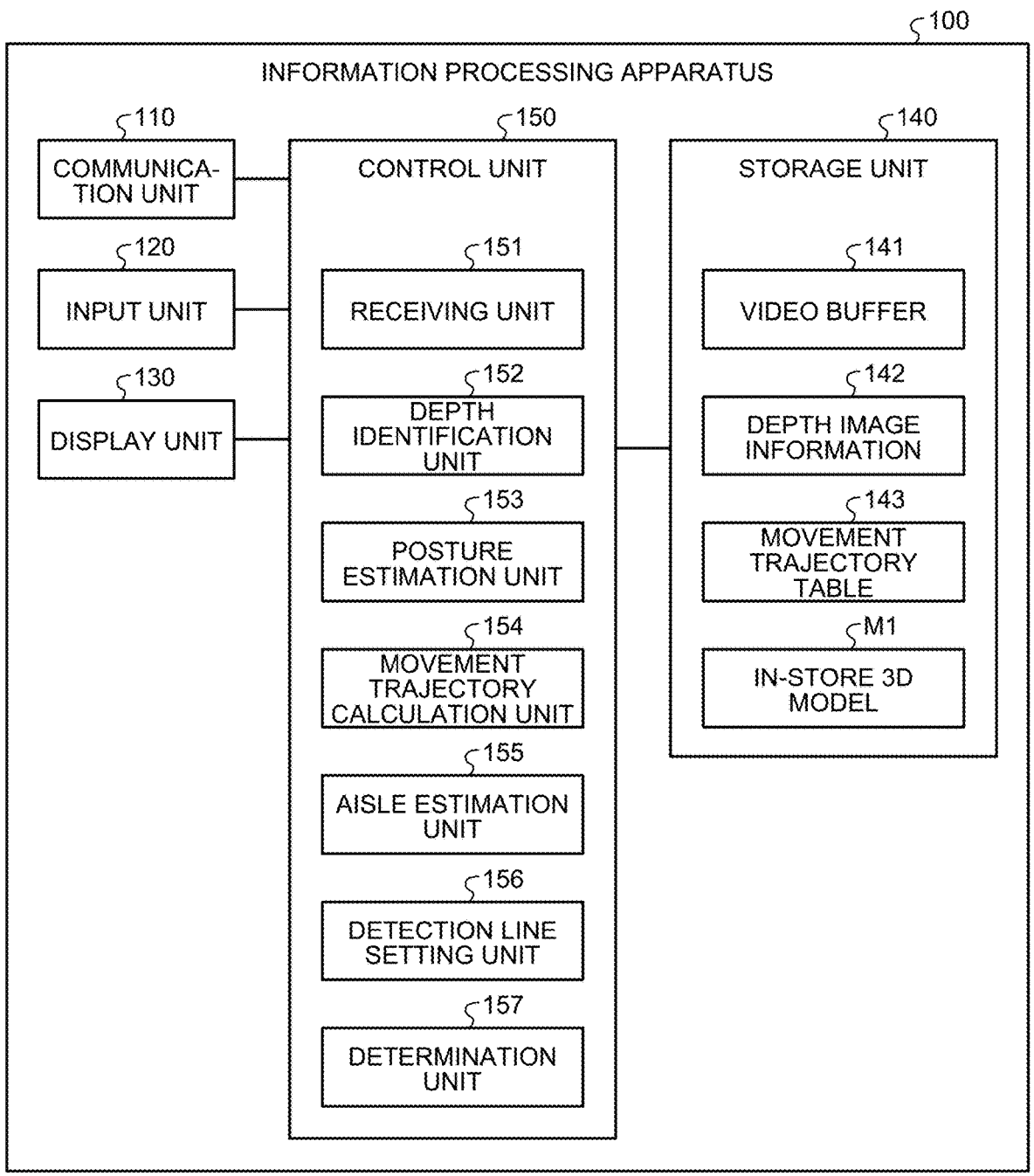
FIG. 6 is a functional block diagram illustrating a configuration of the information processing apparatus according to the present embodiment.

A configuration example of the information processing apparatus 100 according to the present embodiment will be described below. FIG. 6 is a functional block diagram illustrating a configuration of the information processing apparatus according to the present embodiment. As illustrated in FIG. 6, the information processing apparatus 100 includes a communication unit 110, an input unit 120, a display unit 130, a storage unit 140, and a control unit 150.

The communication unit 110 transmits and receives information to and from the camera 10 via the network 15. The communication unit 110 receives the video information from the camera 10. For example, the communication unit 110 is implemented by a network interface card (NIC) or the like.

The input unit 120 is implemented by an input device, such as a keyboard or a mouse, and inputs various kinds of information to the control unit 150 in accordance with input operation performed by an administrator or the like.

The display unit 130 is implemented by a display device, such as a liquid crystal display. For example, the display unit 130 may display a processing result of the control unit 150.

The storage unit 140 stores therein a video buffer 141, a depth image information 142, a movement trajectory table 143, and the in-store 3D model M1. The storage unit 140 is implemented by, for example, a semiconductor memory device, such as a flash memory, or a storage device, such as a hard disk or an optical disk.

The video buffer 141 is a buffer for storing the video information that is transmitted from the camera 10. For example, the video buffer 141 stores therein the video information Im1 illustrated in FIG. 2, the video information Im3 illustrated in FIG. 3, and the like.

The depth image information 142 has a plurality of pixels, and distance information is set for each of the pixels. A plurality of pixels of a video (image) corresponds to a plurality of constituent elements. The distance information indicates a distance between an in-store area corresponding to the pixel of the video information and the camera 10. The depth image information 142 corresponds to the depth image Im2 illustrated in FIG. 2, or the like.

The movement trajectory table 143 is a table for storing information on a movement trajectory of a user. FIG. 7 is a diagram illustrating an example of a data structure of the movement trajectory table. As illustrated in FIG. 7, the movement trajectory table 143 associates user identification (ID) with the movement trajectory. The user ID is information for distinguishing a user who is identified from the video information of the camera 10. The movement trajectory indicates a movement trajectory of the user who is identified from the video information, and location information is set at predetermined time intervals.

The in-store 3D model M1 is a three-dimensional in-store model described above with reference to FIG. 3. For example, in the in-store 3D model M1, a three-dimensional coordinate of each of corners of the shelves 8a and 8b, a three-dimensional coordinate of each of corners of the aisle area f1, three-dimensional coordinates of a start point and an end point indicating the aisle direction d1, and the like are defined.

Referring back to explanation of FIG. 6, the control unit 150 includes a receiving unit 151, a depth identification unit 152, a posture estimation unit 153, a movement trajectory calculation unit 154, an aisle estimation unit 155, a detection line setting unit 156, and a determination unit 157. The control unit 150 is implemented by a central processing unit (CPU) or a micro processing unit (MPU). Further, the control unit 150 may be implemented by, for example, an integrated circuit, such as an application specific integrated circuit (ASIC) or a field programmable gate array (FPGA).

The receiving unit 151 receives video information from the camera 10. The receiving unit 151 stores the received video information in the video buffer 141.

The depth identification unit 152 generates the depth image information 142 by inputting video information that is received from the camera 10 during a time period in which a user is not present in the store into a trained first learning model that performs monocular depth estimation. For example, the learning model is trained on the basis of teacher data that uses the video information as an input and uses the distance information at each of the pixels of the video information as a correct answer label. The depth identification unit 152 stores the depth image information 142 in the storage unit 140.

The posture estimation unit 153 estimates the skeleton information on a user by inputting video information that is received from the camera 10 during a time period in which the user is present in the store into a trained second learning model. For example, the posture estimation unit 153 sequentially inputs chronological images included in the video information into the second learning model, and sequentially estimates pieces of skeleton information in the respective images. The posture estimation unit 153 outputs the pieces of chronological skeleton information to the movement trajectory calculation unit 154.

Meanwhile, at the time of recognition for detecting whether the user extends his/her hand to a product, the posture estimation unit 153 outputs the pieces of chronological skeleton information to the detection line setting unit 156 and the determination unit 157.

Figure 8:
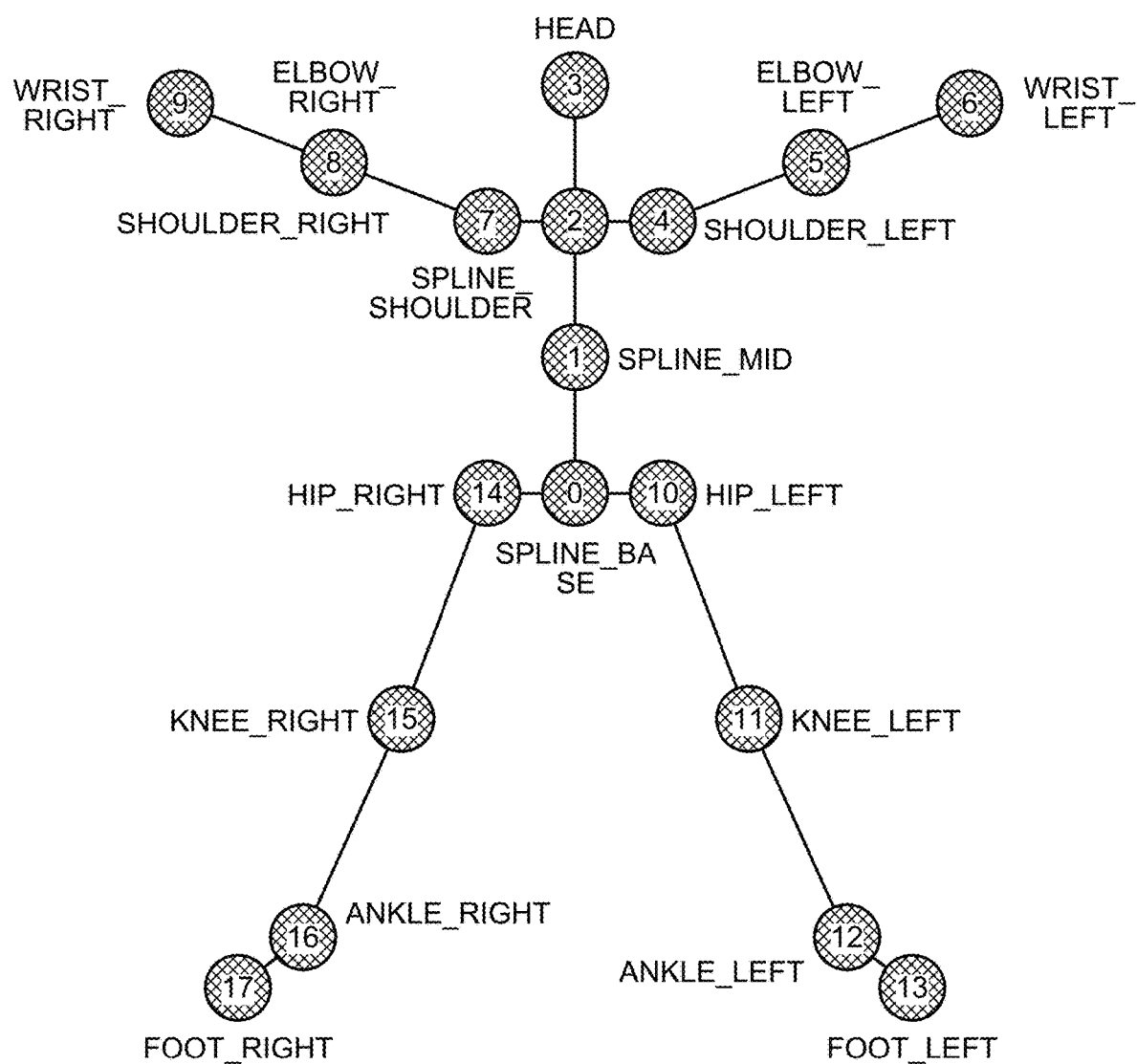
FIG. 8 is a diagram illustrating an example of skeleton information.

For example, the second learning model is a trained machine learning model that inputs an image including an area of the user and outputs the skeleton information. For example, the second learning model is constructed by using an existing algorithm, such as DeepPose or OpenPose. FIG. 8 is a diagram illustrating an example of the skeleton information. As the skeleton information, 18 pieces of definition information (with the numbers 0 to 17) in each of which a joint identified by a well-known skeleton model is assigned with a number may be used. For example, a right shoulder joint (SHOULDER RIGHT) is assigned with the number 8, a left elbow joint (ELBOW_LEFT) is assigned with the number 5, a left knee joint (KNEE_LEFT) is assigned with the number 11, and a right hip joint (HIP_RIGHT) is assigned with the number 14. Therefore, it is possible to acquire coordinate information on 18 skeletons as illustrated in FIG. 8 from the image data, and, for example, "X coordinate=X7 and Y coordinate=Y7" is acquired as a position of the right shoulder joint with the number 7. Meanwhile, the X axis may be defined as a horizontal direction of an image and the Y axis may be defined as a vertical direction of the image.

The movement trajectory calculation unit 154 calculates the movement trajectory of the user on the basis of changes of the pieces of chronological skeleton information acquired from the posture estimation unit 153. The movement trajectory calculation unit 154 assigns the user ID to the movement trajectory and stores the user ID in association with information on the movement trajectory of the user in the movement trajectory table 143. For example, the movement trajectory calculation unit 154 identifies a position of a foot in the pieces of chronological skeleton information, and calculates a temporal change of the position of the foot (for example, two-dimensional coordinate) as the movement trajectory. The position of the foot in the skeleton information may be the coordinate with the number 17 (FOOT_RIGHT), the coordinate with the number 13 (FOOT_LEFT), an average of the coordinates with the numbers 17 and 13, or the like in the pieces of skeleton information illustrated in FIG. 8.

Meanwhile, if the position of the foot is not observed, the movement trajectory calculation unit 154 may estimate the position of the foot from each of the joints in the pieces of other observed skeleton information, and adopt the estimated position as the position of the foot.

The aisle estimation unit 155 estimates the aisle area and the aisle direction on the basis of the information on each of movement trajectories stored in the movement trajectory table 143. The aisle estimation unit 155 outputs the information on the estimated aisle area and the estimated aisle direction to the detection line setting unit 156.

One example of a process of estimating the aisle area by the aisle estimation unit 155 will be described below. The aisle estimation unit 155 calculates a polygon including the position of the foot in each of the movement trajectories, and estimates the calculated polygon as the position of the aisle area. For example, the information on the aisle area estimated by the aisle estimation unit 155 corresponding to the aisle area f1 illustrated in FIG. 2.

One example of a process of estimating the aisle direction by the aisle estimation unit 155 will be described below. A mean vector of displacement vectors of the foot in the plurality of movement trajectories is estimated as the aisle direction. For example, the information on the aisle direction estimated by the aisle estimation unit 155 corresponds to the aisle direction d1 illustrated in FIG. 2.

The detection line setting unit 156 sets, on the shelf, a detection line for detecting that a user has extended a hand to a product. For example, the detection line setting unit 156 performs a process of generating the in-store 3D model M1 and thereafter performs a process of setting the detection line.

One example of the process of generating the in-store 3D model M1 by the detection line setting unit 156 will be described below. The detection line setting unit 156 generates the in-store 3D model M1 for a three-dimensional space on the basis of the depth image information 142, the aisle area f1, and the aisle direction d1.

For example, the detection line setting unit 156 converts the distance information on the depth image information 142 into a three-dimensional coordinate in the in-store 3D model M1 on the basis of the distance information on the depth image information 142 and a first definition table. The first definition table is a table in which a relationship between the distance information and the three-dimensional coordinate in the in-store 3D model M1 is defined.

The detection line setting unit 156 converts the coordinate of the aisle area f1 and the coordinate of the aisle direction d1 into three-dimensional coordinates in the in-store 3D model M1 on the basis of the coordinate of the aisle area f1, the coordinate of the aisle direction d1, and a second definition table. The second definition table is a table in which a relationship among the coordinate of the aisle area f1, the coordinate of the aisle direction d1, and the three-dimensional coordinates in the in-store 3D model M1 is defined.

For example, the detection line setting unit 156 identifies, as a shelf, an object that is located in an area other than the aisle area f1 among objects that are located in the in-store 3D model M1 obtained from the distance information on the depth image information 142. In the example illustrated in FIG. 3, the detection line setting unit 156 identifies, as the shelves 8a and 8b, objects other than the aisle area f1 in the in-store 3D model M1.

One example of the process of setting the detection line by the detection line setting unit 156 will be described below. For example, at the time of recognition for detecting whether the user has extended a hand to a product, the detection line setting unit 156 acquires the skeleton information from the posture estimation unit 153, and calculates the position of the foot (the three-dimensional coordinate) of the user. For example, it is assumed that the position of the foot calculated by the detection line setting unit 156 is the position p1' as illustrated in FIG. 3. The detection line setting unit 156 arranges the plane H1 in the in-store 3D model M1 such that the segment l1 at the lower edge of the plane H1 passes through the position p1' and is located perpendicular to the aisle direction d1. For example, the coordinate of each of the joints in the pieces of skeleton information estimated by the posture estimation unit 153 is a two-dimensional coordinate, and the detection line setting unit 156 calculates a three-dimensional coordinate by using a conversion table for converting a two-dimensional coordinate into a three-dimensional coordinate, or the like.

The detection line setting unit 156 sets the detection line L10a that connects the point a1 at which the segment l1 and the shelf 8a come into contact with each other and the upper edge b1 of the shelf 8a, with respect to the shelves 8a and 8b for products. The detection line setting unit 156 sets the detection line L10b that connects the point a2 at which the segment l1 and the shelf 8b come into contact with each other and the upper edge b2 of the shelf 8b. The detection line setting unit 156 outputs information on the detection lines L10a and L10b that are set as described above to the determination unit 157.

The detection line setting unit 156 performs the above-described process every time the user moves and the position p1' is changed, sets-set the detection lines L10a and L10b again, and outputs information on the re-set detection lines L10a and L10b to the determination unit 157.

The determination unit 157 detects that the user has extended a hand to a product on the basis of the detection line acquired from the detection line setting unit 156, and determines whether the user has taken out the product from the shelf. One example of a process performed by the determination unit 157 will be described below.

The determination unit 157 acquires the skeleton information from the posture estimation unit 153, and calculates the position of the hand of the user (two-dimensional coordinate). For example, the determination unit 157 calculates, as the position of the hand of the user, the coordinate with the number 6 (WRIST_RIGHT) or the coordinate with the number 9 (WRIST_LEFT) in the pieces of skeleton information illustrated in FIG. 8. In the following descriptions, the coordinate with the number 6 (WRIST_RIGHT) will be referred to as a position of a right hand. The coordinate with the number 9 (WRIST_LEFT) will be referred to as a position of a left hand.

A process performed by the determination unit 157 will be described below with respect to the detection line L10a. The determination unit 157 compares the position of the detection line L10a, the position of the right hand, and the position of the left hand, and adopts one of the right hand and the left hand closer to the position of the detection line L10a as a hand of interest. In this example, explanation will be given based on the assumption that the right hand is adopted as the hand of interest.

The determination unit 157 calculates a distance between the position of the detection line L10a and the position of the right hand, and determines that the user has extended the hand to the product on the shelf if the distance is smaller than a threshold. If it is determined that the user has extended the hand to the product on the shelf, the determination unit 157 detects an action of taking out the product by the user through a process as described below.

Figure 9:
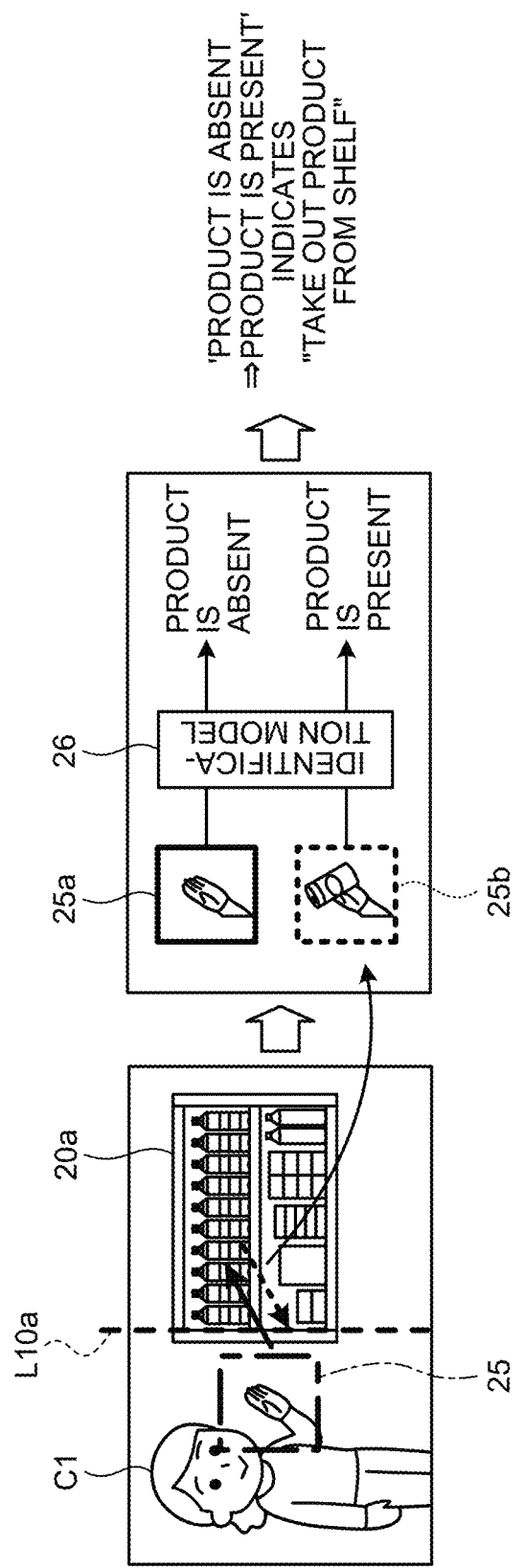
FIG. 9 is a diagram for explaining a process of detecting an action of taking out a product.

FIG. 9 is a diagram for explaining a process of detecting the action of taking out a product. The determination unit 157 acquires an image (video information) of an area 25 that is set near the detection line L10a from the video buffer 141. As described above, the position of the detection line L10a is changed depending on the position of the user C1, and therefore, it is assumed that a position of the area 25 is dynamically changed depending on the position of the detection line L10a.

For example, it is assumed that an image of the area 25, which is obtained when the user C1 extends a hand to a shelf 20a, will be referred to as an image 25a. It is assumed that an image of the area 25, which is obtained when the user C1 returns the hand from the shelf 20a, will be referred to as an image 25b. The determination unit 157 determines whether the product is present in the hand of the user C1 by using an identification model 26. The identification model 26 is a model for identifying whether the product is present in the hand of the user, and may be a learning model based on Human Object Interaction Detection (HOID) or the like.

If it is identified that the "product is absent" by inputting the image 25a into the identification model 26 and it is identified that the "product is present" by inputting the image 25b into the identification model 26, the determination unit 157 detects that the user C1 has performed the action of taking out the product.

In contrast, if it is identified that the "product is present" by inputting the image 25a into the identification model 26 and it is identified that the "product is absent" by inputting the image 25b into the identification model 26, the determination unit 157 detects that the user C1 has performed the action of returning the product.

Here, if the video information (image) from the camera 10 is used, in some cases, the shelf appears in the background of the user and the same product as the product held by the user may also appear, which leads to reduction in determination accuracy on whether the user is holding the product. The determination unit 157 may compare an image (background image) that is obtained before the user C appears and a current image to improve image recognition accuracy.

Figure 10:
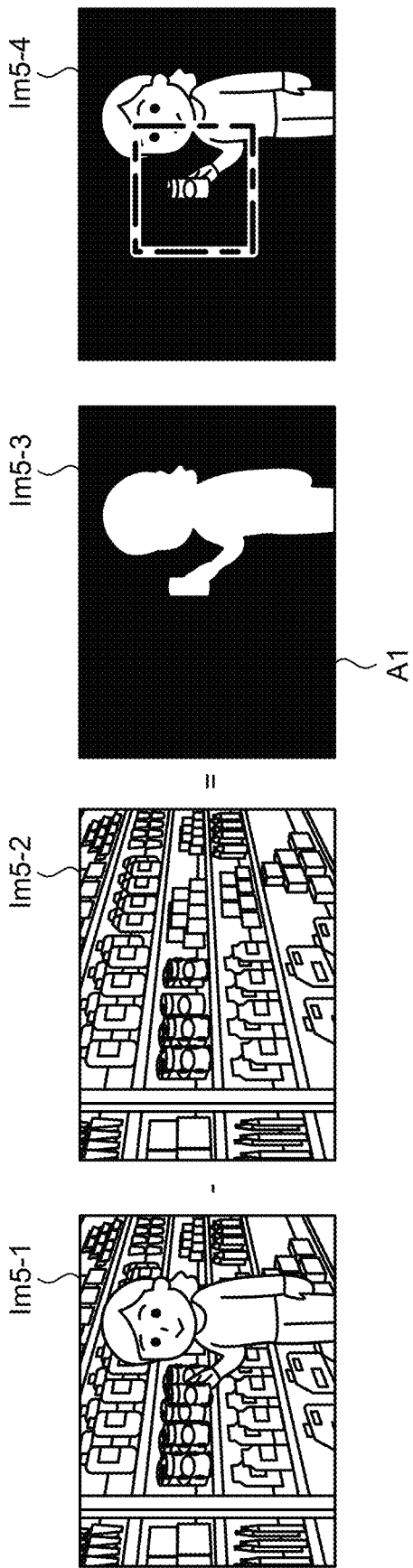
FIG. 10 is a diagram for explaining another process performed by a determination unit.

FIG. 10 is a diagram for explaining another process performed by the determination unit. As illustrated in FIG. 10, when extracting an input image Im5-1 (video information) from the video buffer 141 and performing image processing, the determination unit 157 generates a foreground mask Im5-3 by subtracting a background image Im5-2 that is prepared in advance from the input image Im5-1. The determination unit 157 compares the input image Im5-1 and the foreground mask Im5-3, and generates an image Im5-4 in which an area other than an area of a mask A1 is extracted. The image Im5-4 does not include a background image, so that it is possible to improve accuracy in executing the detection process as described above with reference to FIG. 9.

Figure 11:
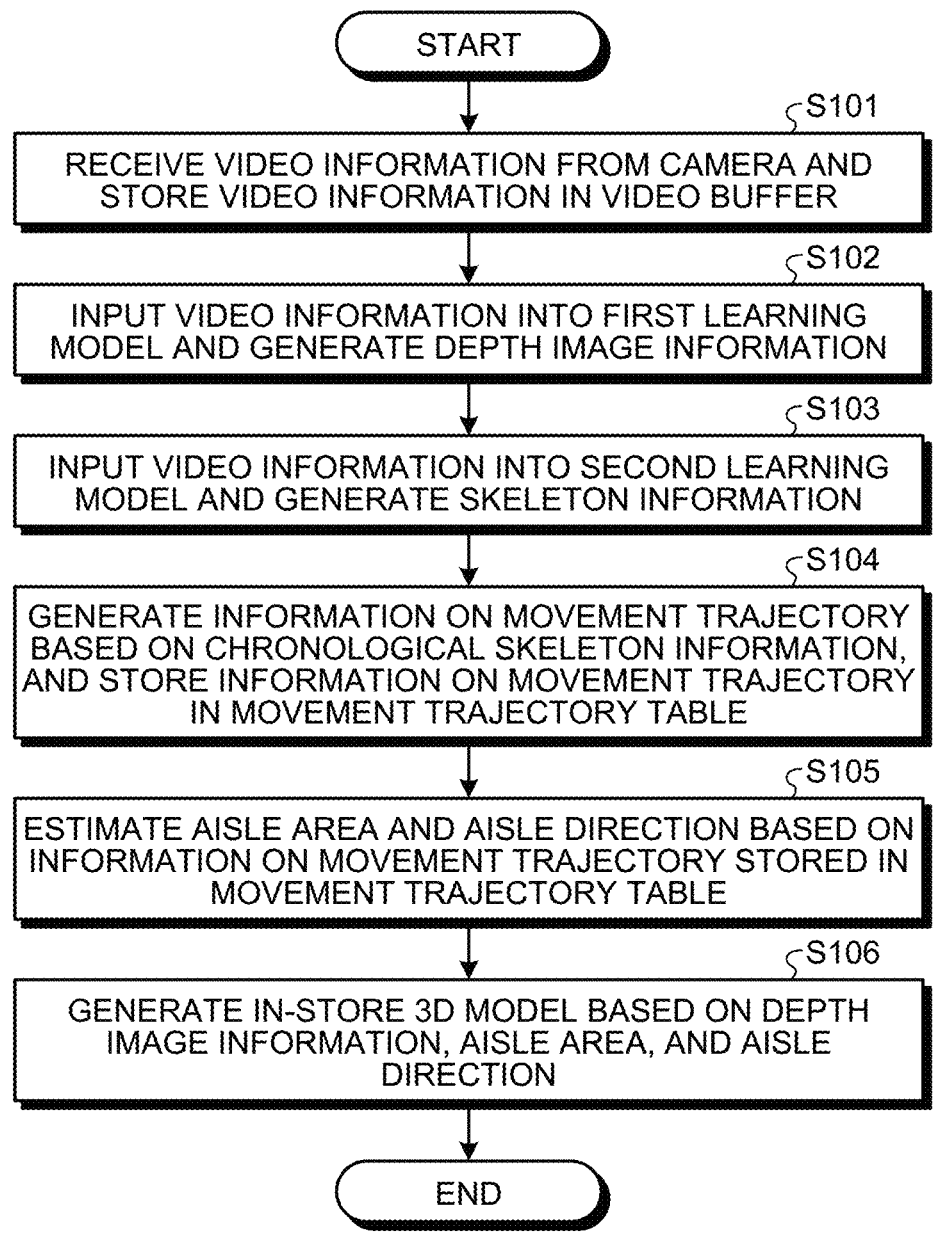
FIG. 11 is a flowchart illustrating a pre-setting process performed by the information processing apparatus.

One example of the flow of the process performed by the information processing apparatus 100 according to the present embodiment will be described below. FIG. 11 is a flowchart illustrating a pre-setting process performed by the information processing apparatus. As illustrated in FIG. 11, the receiving unit 151 of the information processing apparatus 100 receives video information from the camera 10, and stores the video information in the video buffer 141 (Step S101).

The depth identification unit 152 of the information processing apparatus 100 inputs the video information into the first learning model, and generates the depth image information 142 (Step S102). The posture estimation unit 153 of the information processing apparatus 100 inputs the video information into the second learning model, and generates the skeleton information (Step S103).

The movement trajectory calculation unit 154 of the information processing apparatus 100 generates the information on the movement trajectory on the basis of the chronological skeleton information, and stores the information on the movement trajectory in the movement trajectory table 143 (Step S104). The aisle estimation unit 155 of the information processing apparatus 100 estimates the aisle area and the aisle direction on the basis of the information on the movement trajectory stored in the movement trajectory table 143 (Step S105).

The detection line setting unit 156 of the information processing apparatus 100 generates the in-store 3D model M1 on the basis of the depth image information 142, the aisle area, and the aisle direction (Step S106).

Figure 12:
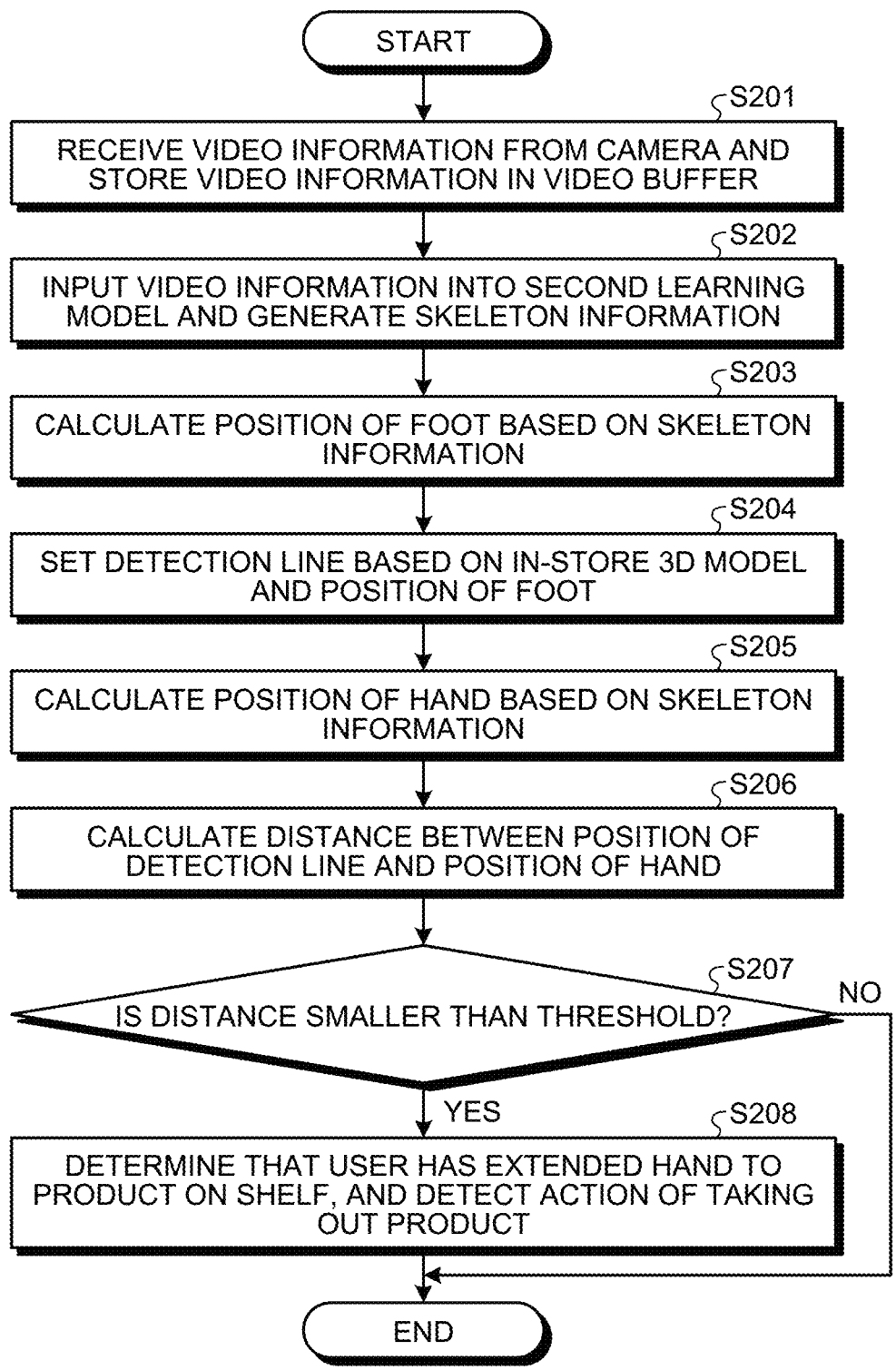
FIG. 12 is a flowchart of a detection process performed by the information processing apparatus.

FIG. 12 is a flowchart illustrating the detection process performed by the information processing apparatus. As illustrated in FIG. 12, the receiving unit 151 of the information processing apparatus 100 receives video information from the camera 10, and stores the video information in the video buffer 141 (Step S201).

The posture estimation unit 153 of the information processing apparatus 100 inputs the video information into the second learning model, and generates the skeleton information (Step S202). The detection line setting unit 156 of the information processing apparatus 100 calculates a position of a foot on the basis of the skeleton information (Step S203). The detection line setting unit 156 sets the detection line on the basis of the in-store 3D model M1 and the position of the foot (Step S204).

The determination unit 157 of the information processing apparatus 100 calculates a position of a hand on the basis of the skeleton information (Step S205). The determination unit 157 calculates a distance between the position of the detection line and the position of the hand (Step S206). If the distance is smaller than a threshold (Yes at Step S207), the determination unit 157 determines that the user has extended the hand to a product on the shelf, and detects an action of taking out the product (Step S208).

In contrast, if the distance is not smaller than the threshold (No at Step S207), the determination unit 157 terminates the process.

Effects achieved by the information processing apparatus 100 according to the present embodiment will be described below. The information processing apparatus 100 generates the in-store 3D model M1 on the basis of the depth image information 142 and the movement trajectory of the user, which are obtained from the video information of the camera 10, sets a detection line of a shelf for each standing position of the user on a floor, and uses the detection line for detection. In this manner, by setting the detection line for each standing position of the user, it is possible to detect taking in and out a product with high accuracy as compared to a case in which the detection line is set in advance as in the conventional technology.

The information processing apparatus 100 identifies a change of the position of the foot of the user on the basis of the pieces of chronological skeleton information on the user, and identifies, as an aisle area, a polygon in which the identified change of the position of the foot is included. With this configuration, it is possible to identify three-dimensional positions of the aisle area and the shelf in the in-store 3D model M1.

The information processing apparatus 100 identifies a change of the position of the foot of the user on the basis of the pieces of chronological skeleton information on the user, and identifies the aisle direction on the basis of the displacement directional vector based on the identified position of the foot. By arranging a plane that crosses the identified aisle direction at a right angle in the in-store 3D model M1, it is possible to set the detection line with high accuracy.

The information processing apparatus 100 sets the detection line for each standing position of the user, identifies a part corresponding to a hand of the user on the basis of the skeleton information on the user, and detects that the user has extended the hand to a product stored in the shelf, on the basis of a positional relationship between the detection line and the part of the hand. With this configuration, it is possible to detect the action of taking out the product from the user.

Furthermore, according to the information processing apparatus 100, it is possible to set the detection line by setting the in-store 3D model M1 in advance and identifying only the position of the foot of the user, so that it is possible to reduce a processing load of the information processing apparatus 100. Moreover, it is possible to detect the action of taking out a product from the shelf by the user without using a high-definition camera.

Figure 13:
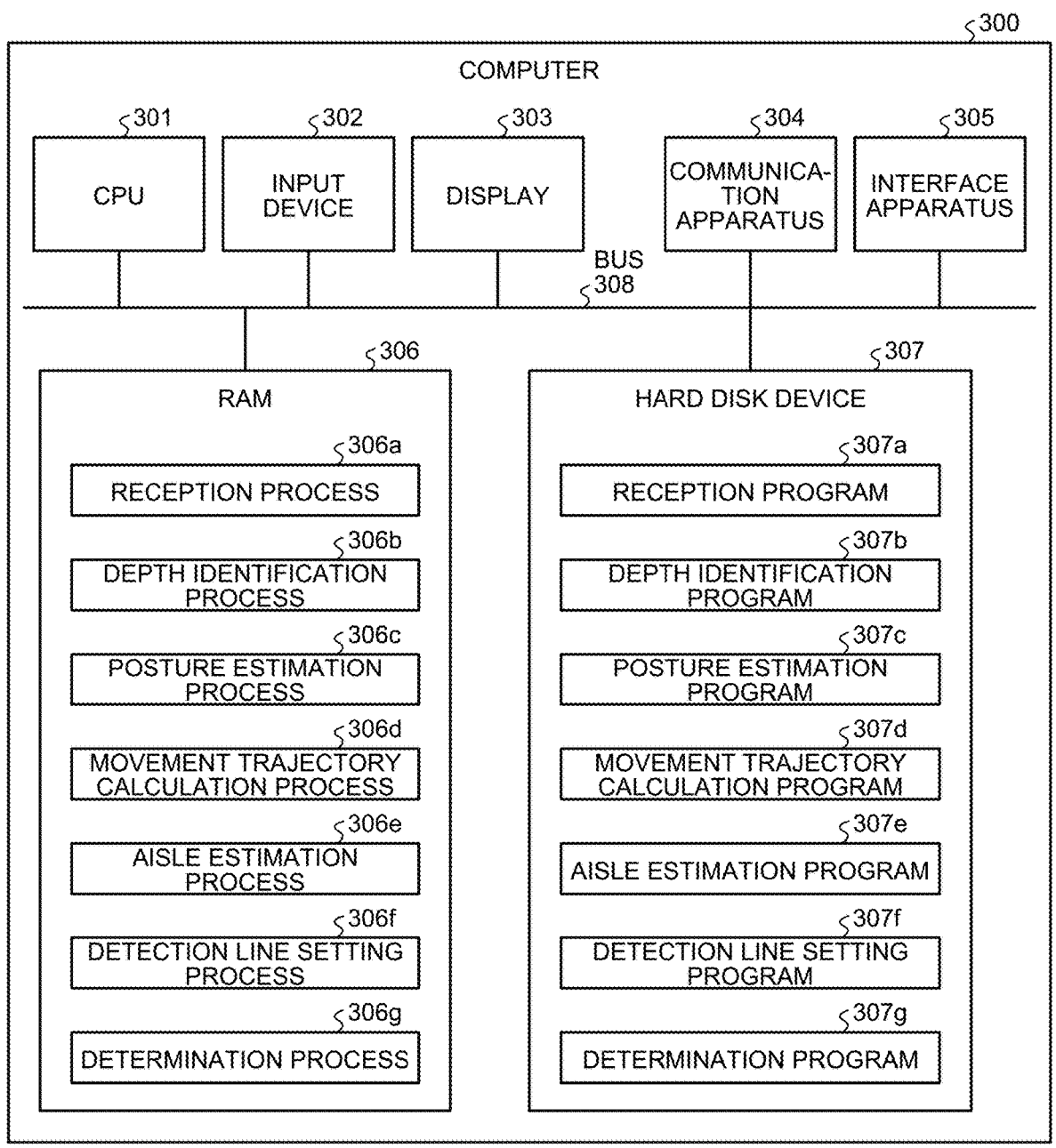
FIG. 13 is a diagram illustrating an example of a hardware configuration of a computer that implements the same functions as those of the information processing apparatus of one embodiment.
Figure 14:
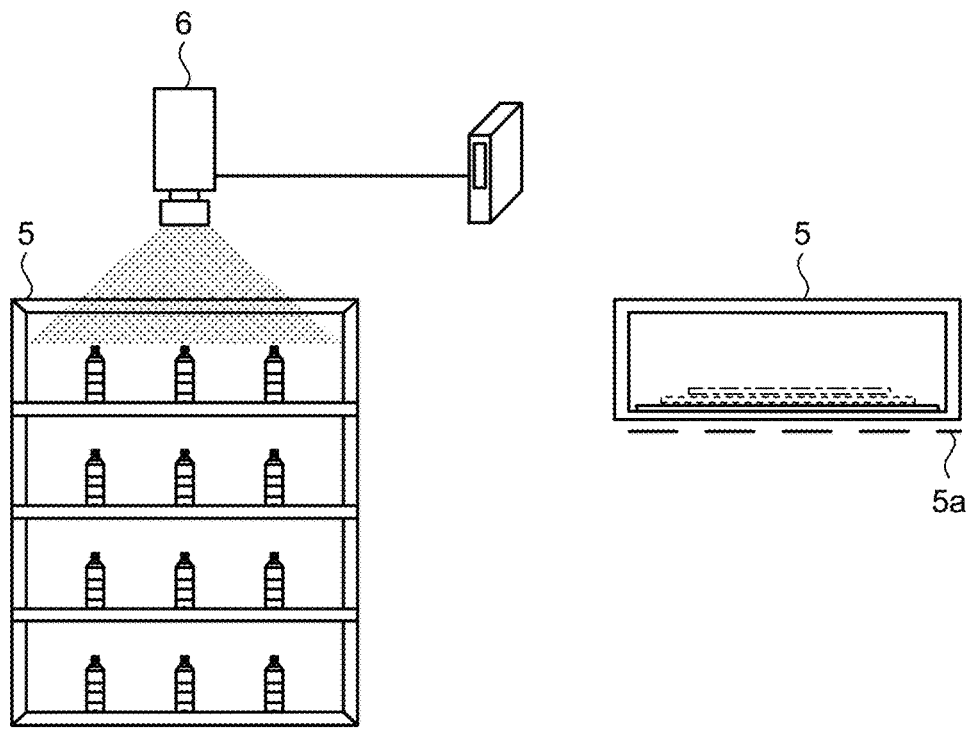
FIG. 14 is a diagram for explaining the conventional technology.
Figure 15:
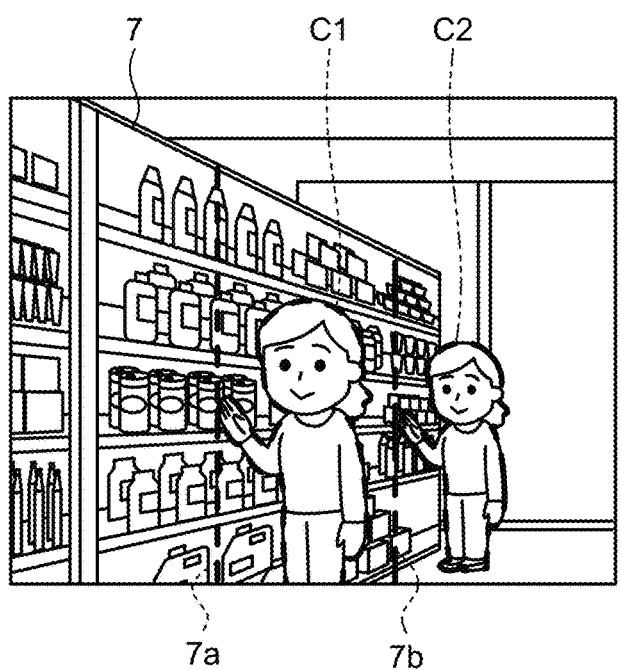
FIG. 15 is a diagram illustrating an example of an appropriate detection line.

One example of a hardware configuration of a computer that implements the same functions as those of the information processing apparatus 100 of the embodiment as described above will be described below. FIG. 13 is a diagram illustrating an example of the hardware configuration of the computer that implements the same functions as those of the information processing apparatus of one embodiment.

As illustrated in FIG. 13, a computer 300 includes a CPU 301 that performs various kinds of arithmetic processing, an input device 302 that receives input of data from a user, and a display 303. Furthermore, the computer 300 includes a communication apparatus 304 that transmits and receives data to and from an external apparatus or the like via a wired or wireless network, and an interface apparatus 305. Moreover, the computer 300 includes a random access memory (RAN) 306 for temporarily storing various kinds of information, and a hard disk device 307. Furthermore, all of the devices 301 to 307 are connected to a bus 308.

The hard disk device 307 includes a reception program 307a, a depth identification program 307b, a posture estimation program 307c, a movement trajectory calculation program 307d, and an aisle estimation program 307e. The hard disk device 307 further includes a detection line setting program 307f and a determination program 307g. Furthermore, the CPU 301 reads each of the programs 307a to 307g and loads the programs 307a to 307g onto the RAM 306.

The reception program 307a functions as a reception process 306a. The depth identification program 307b functions as a depth identification process 306b. The posture estimation program 307c functions as a posture estimation process 306c. The movement trajectory calculation program 307d functions as a movement trajectory calculation process 306d. The aisle estimation program 307e functions as an aisle estimation process 306e. The detection line setting program 307f functions as a detection line setting process 306f. The determination program 307g functions as a determination process 306g.

A process of the reception process 306a corresponds to the process performed by the receiving unit 151. A process of the depth identification process 306b corresponds to the process performed by the depth identification unit 152. A process of the posture estimation process 306c corresponds to the process performed by the posture estimation unit 153. A process of the movement trajectory calculation process 306d corresponds to the process performed by the movement trajectory calculation unit 154. A process of the aisle estimation process 306e corresponds to the process performed by the aisle estimation unit 155. A process of the detection line setting process 306f corresponds to the process performed by the detection line setting unit 156. A process of the determination process 306g corresponds to the process performed by the determination unit 157.

Meanwhile, each of the programs 307a to 307g need not always be stored in the hard disk device 307 from the beginning. For example, each of the programs may be stored in a "portable physical medium", such as a flexible disk (FD), a compact disk-ROM (CD-ROM), a digital versatile disk (DVD), a magneto optical disk, or an integrated circuit (IC) card, which is inserted into the computer 300. Further, the computer 300 may read and execute each of the programs 307a to 307g.

It is possible to detect taking in and out a product.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a setting program that causes a computer to execute a process, the process comprising:
acquiring a video from a camera that is set in a store that has a storage in which a product is stored;
identifying a depth indicating a distance from the camera to each of constituent elements of the video acquired from the camera, by inputting the acquired video into a machine learning model;
generating a three-dimensional in-store model that is configured with the identified depth indicating the distance from the camera to each of the constituent elements of the video;
generating skeleton information on a person who moves inside the store from the video acquired from the camera;
setting a range and a direction of an aisle in the store in the generated three-dimensional in-store model based on a change in the generated skeleton information; and
setting a detection line in the storage based on the range and the direction of the aisle in the store, the detection line for detecting that the person has extended a hand to a product.

2. The non-transitory computer-readable recording medium according to claim 1, wherein the setting the range and the direction of the aisle in the store includes
identifying a change of a position of a foot included in the skeleton information on the person; and
setting, as the range of the aisle, a polygon that includes a change of the identified position of the foot.

3. The non-transitory computer-readable recording medium according to claim 1, wherein the setting the range and the direction of the aisle in the store includes
identifying a change of a position of a foot included in the skeleton information on the person; and
setting the direction based on a displacement directional vector that is based on the change of the position of the foot.

4. A non-transitory computer-readable recording medium having stored therein a detection program that causes a computer to execute a process, the process comprising:
identifying a detection line for detecting that a person has extended a hand to a product, the detection line being included in setting information, the setting information being set in a storage, based on range and a direction of an aisle in a store, the range and the direction being included in a three-dimensional in-store model that is configured with a depth indicating a distance from a camera that is set in the store to each of constituent elements of a video from the camera;
identifying a part corresponding to a hand of the person based on skeleton information on the person generated from a video in which an inside of the store is captured; and
detecting that the person has extended the hand to a product that is stored in the storage, based on a positional relationship between the identified part corresponding to the hand of the person and the detection line included in the setting information.

5. A setting method comprising:
acquiring a video from a camera that is set in a store that has a storage in which a product is stored;
identifying a depth indicating a distance from the camera to each of constituent elements of the video acquired from the camera, by inputting the acquired video into a machine learning model;
generating a three-dimensional in-store model that is configured with the identified depth indicating the distance from the camera to each of the constituent elements of the video;
generating skeleton information on a person who moves inside the store from the video acquired from the camera;
setting a range and a direction of an aisle in the store in the generated three-dimensional in-store model based on a change in the generated skeleton information; and
setting a detection line in the storage based on the range and the direction of the aisle in the store, the detection line for detecting that the person has extended a hand to a product, by using a processor.

6. The setting method according to claim 5, wherein the setting the range and the direction of the aisle in the store includes
identifying a change of a position of a foot included in the skeleton information on the person; and
setting, as the range of the aisle, a polygon that includes a change of the identified position of the foot.

7. The setting method according to claim 5, wherein setting the range and the direction of the aisle in the store includes
identifying a change of a position of a foot included in the skeleton information on the person; and
setting the direction based on a displacement directional vector that is based on the change of the position of the foot.

8. A setting apparatus comprising:
a memory; and
a processor coupled to the memory and configured to:
acquire a video from a camera that is set in a store that has a storage in which a product is stored;
identify a depth indicating a distance from the camera to each of constituent elements of the video acquired from the camera, by inputting the acquired video into a machine learning model;
generate a three-dimensional in-store model that is configured with the identified depth indicating the distance from the camera to each of the constituent elements of the video;
generate skeleton information on a person who moves inside the store from the video acquired from the camera;
set a range and a direction of an aisle in the store in the generated three-dimensional in-store model based on a change in the generated skeleton information; and set a detection line in the storage based on the range and the direction of the aisle in the store, the detection line for detecting that the person has extended a hand to a product.

9. The setting apparatus according to claim 8, wherein the processor is further configured to identify a change of a position of a foot included in the skeleton information on the person; and set, as the range of the aisle, a polygon that includes a change of the identified position of the foot.

10. A setting apparatus according to claim 8, wherein the processor is further configured to identify a change of a position of a foot included in the skeleton information on the person; and set the direction based on a displacement directional vector that is based on the change of the position of the foot.

* * * * *